(12) United States Patent
Almasan et al.

(10) Patent No.: US 11,307,949 B2
(45) Date of Patent: Apr. 19, 2022

(54) DECREASING DOWNTIME OF COMPUTER SYSTEMS USING PREDICTIVE DETECTION

(71) Applicant: AMERICAN EXPRESS TRAVEL RELATED SERVICES COMPANY, INC., New York, NY (US)

(72) Inventors: Rares Ioan Almasan, Phoenix, AZ (US); Jeffery Freed, Scottsdale, AZ (US); Kai Wang, Stony Brook, NY (US)

(73) Assignee: American Express Travel Related Services Company, Inc., New York, NY (US)

(*) Notice: Subject to any disclaimer, the term of this patent is extended or adjusted under 35 U.S.C. 154(b) by 298 days.

(21) Appl. No.: 15/813,953

(22) Filed: Nov. 15, 2017

(65) Prior Publication Data

US 2019/0149426 A1    May 16, 2019

(51) Int. Cl.
| | |
|---|---|
| *G06F 11/00* | (2006.01) |
| *G06F 11/30* | (2006.01) |
| *G06N 5/04* | (2006.01) |
| *G06N 20/00* | (2019.01) |
| *G06F 16/20* | (2019.01) |
| *G06F 11/22* | (2006.01) |
| *G06F 11/26* | (2006.01) |
| *G06F 11/34* | (2006.01) |
| *G05B 23/02* | (2006.01) |
| *H04L 41/16* | (2022.01) |

(52) U.S. Cl.
CPC ........ *G06F 11/302* (2013.01); *G05B 23/0218* (2013.01); *G06F 11/008* (2013.01); *G06F 11/22* (2013.01); *G06F 11/261* (2013.01); *G06F 11/30* (2013.01); *G06F 11/34* (2013.01); *G06F 11/3438* (2013.01); *G06F 16/20* (2019.01); *G06N 5/04* (2013.01); *G06N 20/00* (2019.01); *H04L 41/16* (2013.01)

(58) Field of Classification Search
CPC .. G06F 11/3409; G06F 11/004; G06F 11/008; G06F 11/0784; G06F 11/142; G06F 11/3058; G06F 11/261; G06F 30/20; G06F 11/3447; G06N 20/00; G06N 5/04; G06Q 10/0635
See application file for complete search history.

(56) References Cited

U.S. PATENT DOCUMENTS

| | | | | |
|---|---|---|---|---|
| 6,453,468 B1* | 9/2002 | D'Souza | ................ | G06Q 30/06 717/168 |
| 6,859,806 B1* | 2/2005 | Kamarei | ................ | G06Q 10/10 |
| 7,191,435 B2* | 3/2007 | Lau | ........................... | G06F 8/65 714/38.1 |
| 7,428,300 B1* | 9/2008 | Drew | ................. | H04M 3/2254 379/14.01 |
| 8,055,933 B2* | 11/2011 | Jaehde | ................ | G06F 11/2023 714/4.11 |

(Continued)

*Primary Examiner* — Loan L. T. Truong
(74) *Attorney, Agent, or Firm* — Thomas | Horstemeyer, LLP (57) ABSTRACT

A master processor may retrieve historical and real time machine and human data related to computer system health. The master processor may utilize machine learning and artificial intelligence to predict potential computer malfunctions. The master processor may output notifications regarding the potential computer malfunctions in order to prevent the computer malfunctions from occurring.

20 Claims, 3 Drawing Sheets

(56) References Cited

U.S. PATENT DOCUMENTS

| | | | |
|---|---|---|---|
| 8,671,176 B1* | 3/2014 | Kharitonov | H04L 45/02 709/219 |
| 9,103,061 B2* | 8/2015 | Jeffery | D06F 33/02 |
| 9,311,222 B1* | 4/2016 | Avery | G06F 11/3672 |
| 9,489,281 B2* | 11/2016 | Petrick | G06F 11/327 |
| 10,048,996 B1* | 8/2018 | Bell | G06F 11/0709 |
| 10,084,645 B2* | 9/2018 | Bouz | H04L 41/069 |
| 10,157,166 B2* | 12/2018 | Sannino | G06F 11/2257 |
| 10,311,171 B2* | 6/2019 | Greenspan | G06F 17/5009 |
| 10,366,367 B2* | 7/2019 | Kephart | G06Q 10/06 |
| 10,866,848 B2* | 12/2020 | Bridges | G06F 11/008 |
| 2004/0054946 A1* | 3/2004 | Atallah | G06F 8/60 714/38.14 |
| 2005/0015217 A1* | 1/2005 | Weidl | G05B 17/02 702/185 |
| 2006/0031787 A1* | 2/2006 | Ananth | G05B 23/0267 715/771 |
| 2007/0226546 A1* | 9/2007 | Asthana | G06F 11/3688 714/47.1 |
| 2008/0256404 A1* | 10/2008 | Funatsu | G01R 31/318342 714/724 |
| 2009/0125447 A1* | 5/2009 | Gorelik | G06Q 40/06 705/36 R |
| 2011/0054806 A1* | 3/2011 | Goldfine | G07C 3/00 702/34 |
| 2011/0283146 A1* | 11/2011 | Nemecek | G06F 11/008 714/37 |
| 2013/0167245 A1* | 6/2013 | Birtwhistle | G06Q 10/10 726/26 |
| 2013/0179129 A1* | 7/2013 | Patankar | G06F 11/321 703/2 |
| 2013/0298184 A1* | 11/2013 | Ermagan | G06F 21/54 726/1 |
| 2014/0143625 A1* | 5/2014 | Watanabe | G06F 11/008 714/741 |
| 2014/0146648 A1* | 5/2014 | Alber | G11B 27/002 369/53.1 |
| 2015/0082277 A1* | 3/2015 | Champlin-Scharff | G06F 11/368 717/120 |
| 2015/0278219 A1* | 10/2015 | Phipps | H04L 43/12 707/711 |
| 2016/0119195 A1* | 4/2016 | Blondeau | H04L 41/142 709/223 |
| 2016/0205127 A1* | 7/2016 | Roehl | H04L 43/0817 726/25 |
| 2016/0350671 A1* | 12/2016 | Morris, II | G05B 23/0229 |
| 2016/0373306 A1* | 12/2016 | Saha | H04W 4/80 |
| 2017/0161063 A1* | 6/2017 | Bishop | G06F 8/77 |
| 2017/0243131 A1* | 8/2017 | Kephart | G06F 16/00 |
| 2017/0323163 A1* | 11/2017 | Leung | G06K 9/00771 |
| 2018/0039512 A1* | 2/2018 | Almasan | G06F 16/22 |
| 2018/0365036 A1* | 12/2018 | Toal | G06F 9/30047 |
| 2018/0367394 A1* | 12/2018 | Harneja | H04L 41/12 |
| 2018/0367402 A1* | 12/2018 | Harneja | H04L 41/0873 |
| 2019/0121669 A1* | 4/2019 | Almasan | G06F 9/50 |
| 2019/0131905 A1* | 5/2019 | Janakiraman | G05B 19/05 |
| 2019/0138643 A1* | 5/2019 | Saini | G06F 16/248 |
| 2019/0245752 A1* | 8/2019 | Yamane | H04L 41/0677 |

* cited by examiner

DECREASING DOWNTIME OF COMPUTER SYSTEMS USING PREDICTIVE DETECTION

FIELD

The disclosure generally relates to computer systems, and more specifically, to systems and methods for decreasing downtime of computer systems using predictive detection.

BACKGROUND

Business processes may rely on computer tasks to aide in data processing, statistics, analytics and/or the like. Enterprise level computer systems may perform such tasks by operating many applications simultaneously. For entities which provide telephonic support to customers, customer care professionals may rely entirely on application availability in order to provide the appropriate care and support. In some circumstances, if just a single application becomes unavailable, all required applications may become unavailable due to interdependencies between the applications. This may result in significant negative impacts to the entity.

Existing monitoring tools typically work in silos and assist in detecting real time or near-real time problems. In addition, the existing detection is typically evaluated based only on machine-generated data. In some cases, the detected problems may not be immediately resolved, which may result in downtime to the system or downtime for the applications on the system.

SUMMARY

Systems, methods, and articles of manufacture (collectively, the "system") for decreasing computer downtime are disclosed. The system may perform operations including retrieving, by a master processor, machine data from a machine data source; retrieving human data from a human data source; retrieving a change record; retrieving an algorithm from a model library; determining, based on the machine data and the human data, using the algorithm, a likelihood that the change record will cause a computer malfunction; and transmitting a change record evaluation including the likelihood that the change record will cause a computer malfunction.

In various embodiments, the machine data may comprise historical data and real time data. The system may correlate a first spike in a first application with a second spike in a second application. The change record may comprise a software upgrade and a time of upgrade. The human data may comprise a problem record and an incident record. The system may recalibrate the algorithm based on feedback from a subject matter expert. The problem record may identify a previous problem, and the incident record may identify a current problem. The system may select the algorithm from a plurality of algorithms stored in the model library based on an accuracy of the algorithm.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the systems disclosed herein may provide predictive analytics to prevent, decrease or minimize computer malfunctions that would otherwise occur. For example, the system may implement algorithmic intelligence, artificial intelligence, and/or machine learning capabilities in conjunction with human-input data in order to determine that an event may trigger a computer malfunction.

Technology costs and resource costs associated with the maintenance of large scale computer systems may be reduced at least partially due to the decrease in computer malfunctions. Such malfunctions may require significant resources to diagnose, recode, and bring back online. In that regard, the system may result in reductions to monetary costs associated with the unnecessary operation of system components and hardware, including for example, server costs, CPU costs, storage costs, memory costs, and/or the like.

The system further improves the functioning of the computer and/or networked environment by improving the reliability of the computer system and increasing the amount of time that the computer system is capable of performing operations.

Figure 1:
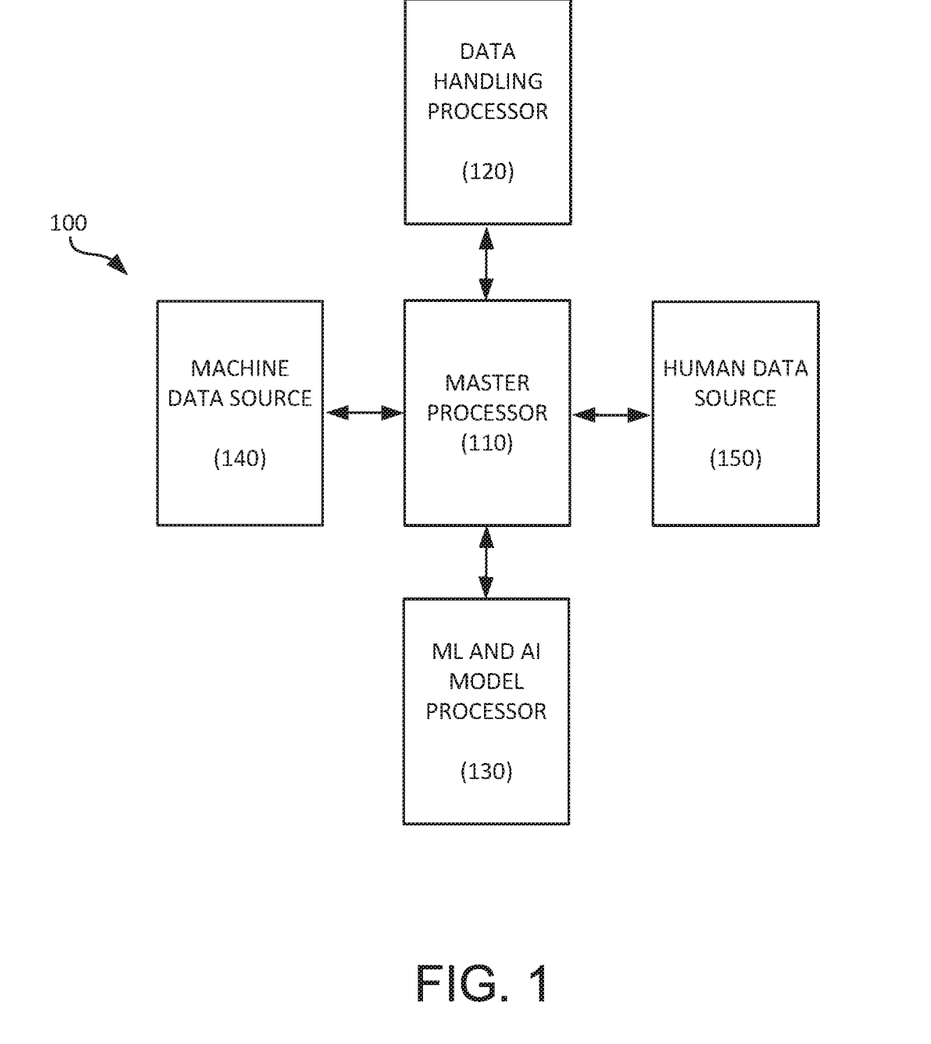
FIG. 1 is a block diagram illustrating various system components of a system for preventing computer downtime, in accordance with various embodiments.

Referring to FIG. 1, a system 100 for decreasing computer downtime is disclosed. The system 100 may be computer based, and may comprise a processor, a tangible non-transitory computer-readable memory, and/or a network interface, along with other suitable system software and hardware components. Instructions stored on the tangible non-transitory memory may allow the system 100 to perform various functions, as described herein. The system 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

The system 100 may comprise one or more of a master machine learning and artificial intelligence processer 110, a data handling processor 120, a machine learning and artificial intelligence model processor 130, a machine data source 140, and a human data source 150. The various systems, coordinators, environments, processors, inventories, databases, containers, and the like in system 100 may be in direct logical communication with each other via a bus, network, and/or through any other suitable means, or may be individually connected as described further herein. For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. For example, and in accordance with various embodiments, the individual components of system 100 may be interconnected via a network.

As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, the master processor 110 may be in electronic and/or logical communication with the data handling processor 120, the machine learning and artificial intelligence model processor 130, the machine data source 140, and the human data source 150. The master processor 110 may comprise any suitable combination of hardware, software, databases, or the like. For example, the master processor 110 may comprise a computer-based system, processor, or the like capable of retrieving data, performing operations, monitoring the operation of various system 100 components, and instructing various system 100 components as discussed further herein. In that regard, the master processor 110 may include one or more processors and/or one or more tangible, non-transitory memories and be capable of implementing logic. In various embodiments, the master processor 110 may comprise a processor configured to implement various logical operations in response to execution of instructions, for example, instructions stored on a non-transitory, tangible, computer-readable medium. The master processor 110 may also provide machine learning, predictive analysis capabilities, and algorithmic and artificial intelligence capabilities, as discussed further herein.

In various embodiments, the master processor 110 may be configured to retrieve machine data from the machine data source 140 and the human data source 150. As used herein, "machine data" refers to data that is generated by a computer. The machine data source 140 may comprise an infrastructure layer and an application layer. The infrastructure layer may comprise hardware components, such as servers, databases, and networking components. The application layer may comprise multiple applications running on the infrastructure layer. The applications may comprise service applications which are utilized by customer care professionals to provide services to customers who communicate with the customer care professionals. For example, the service applications may allow customer care professionals to access and modify data associated with the customers (e.g., customer address, account status, etc.). The application layer may comprise monitoring applications which monitor system health, such as CPU consumption, network congestion, server availability, etc. The application layer may store data collected by the monitoring applications in machine logs.

The master processor 110 may retrieve human data from the human data source 150. As used herein, "human data" refers to data which is generated by a human. The human data may be input and stored on a computer. In various embodiments, the human data may include incident records which describe a previous computer malfunction, change records which describe a change made or planned to be made to a computer system (e.g. software updates, new applications added, etc.), incident records, which describe a computer malfunction in progress, and/or any other data generated by a human.

The machine learning and artificial intelligence model processor 130 may comprise a library including multiple algorithms capable of leveraging machine learning and artificial intelligence tools to automatically propose solution models to be used by the master processor 110, such as PYTHON™ (distributed by Python Software Foundation), Scikit-Learn, open source under the BSD license, etc. The master processor 110 may run the algorithms on the data retrieved from the machine data source 140 and the human data source 150. The master processor 110 may blend the various data with data blending vehicles, such as Splunk IT Service Intelligence™, provided by Splunk, Inc. of San Francisco, Calif., and various toolkits. Based on the results, the master processor 110 may predict that a computer malfunction will occur, for example in response to a proposed change being implemented. The master processor 110 may output the results of the algorithm to the data handling processor 120.

The data handling processor 120 may provide a user interface which allows humans to view and interpret the analytics being calculated by the master processor 110. The data handling processor 120 may provide predictive analytics alerts, dashboards, drilldown dynamic reports, and recycle statistically significant data back into the master processor 110. In response to the master processor 110 determining that a computer malfunction may occur, the data handling processor 120 may display an alert and/or transmit an alert such as an email, text message, automated phone call, or other notification that informs a human that the computer malfunction may occur. The data handling processor 120 may provide recommendations to prevent the computer malfunction from occurring, such as by recommending further testing of a software upgrade prior to implementing the upgrade.

Figure 2:
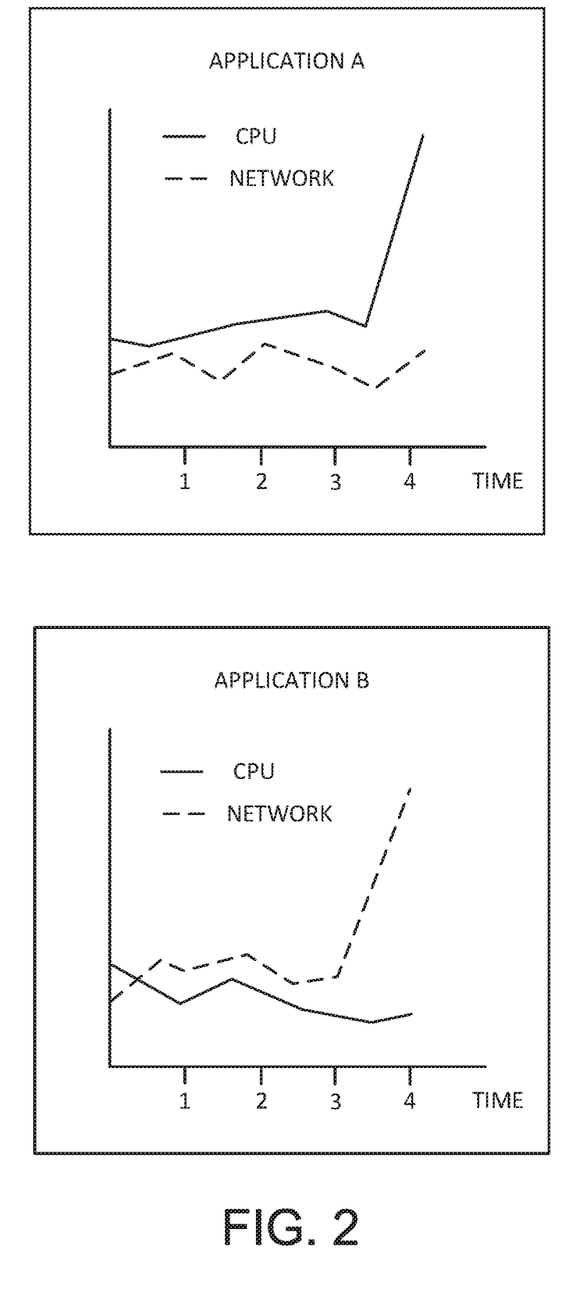
FIG. 2 illustrates an example of key performance indicator monitoring charts, in accordance with various embodiments.

Referring to FIG. 2, examples of CPU consumption and network traffic usage are illustrated for two applications running on system 100, according to various embodiments. As illustrated, a first application A and a second application B may be running simultaneously. Application A may experience a spike in CPU consumption at time T=4. As used herein, a spike refers to an increase of at least three standard deviations over average variability. Application B may experience a spike in network traffic at time T=4. In previous systems which had silo monitoring of individual applications, a technician may evaluate application A without evaluating application B, and it may not be evident why application A is experiencing a spike in CPU consumption. However, by collecting and centralizing application monitoring data in the master processor, the master processor may correlate data between multiple applications to determine the root cause of the spike in CPU consumption of application A. For example, the master processor may determine that application A is requesting data from application B, but because the network traffic for application B is too high, application A is not receiving the requested data, causing application A to keep requesting the data and increasing the CPU consumption of application A.

Additionally, the master processor may evaluate historical machine data to determine why the CPU consumption of application A increased. By evaluating historical data for many attributes (also referred to as key performance indicators), the master processor may evaluate the current values and trends of the key performance indicators to determine whether a computer malfunction is likely to occur.

The master processor may also evaluate the human data and correlate the human data with the machine data. The human data may provide insight into what happened in the past, in order for the master processor to learn from previous problems that have been resolved. For example, a problem record may contain what the problem was, what had been changed, what exactly went wrong, and what fixed the problem. The master processor may thus learn from the problem so it may able to identify similar problems in the future when or before they happen. The human data may also include the incident report, which may describe a problem that is currently in progress. The algorithms may leverage the data in the incident report for detection of future problems.

The master processor may also evaluate change records to identify a change that is scheduled to go into production. The change record may indicate when the change is scheduled to occur. The change record may specify whether the specific script has been tested, and in what environments the change has been tested. The change record may specify how the change will be implemented into production, such as in phases or all at once. By correlating the change record with previous problems and current incident reports, the master processor may identify whether a computer malfunction is likely to occur in response to the change being implemented.

Figure 3:
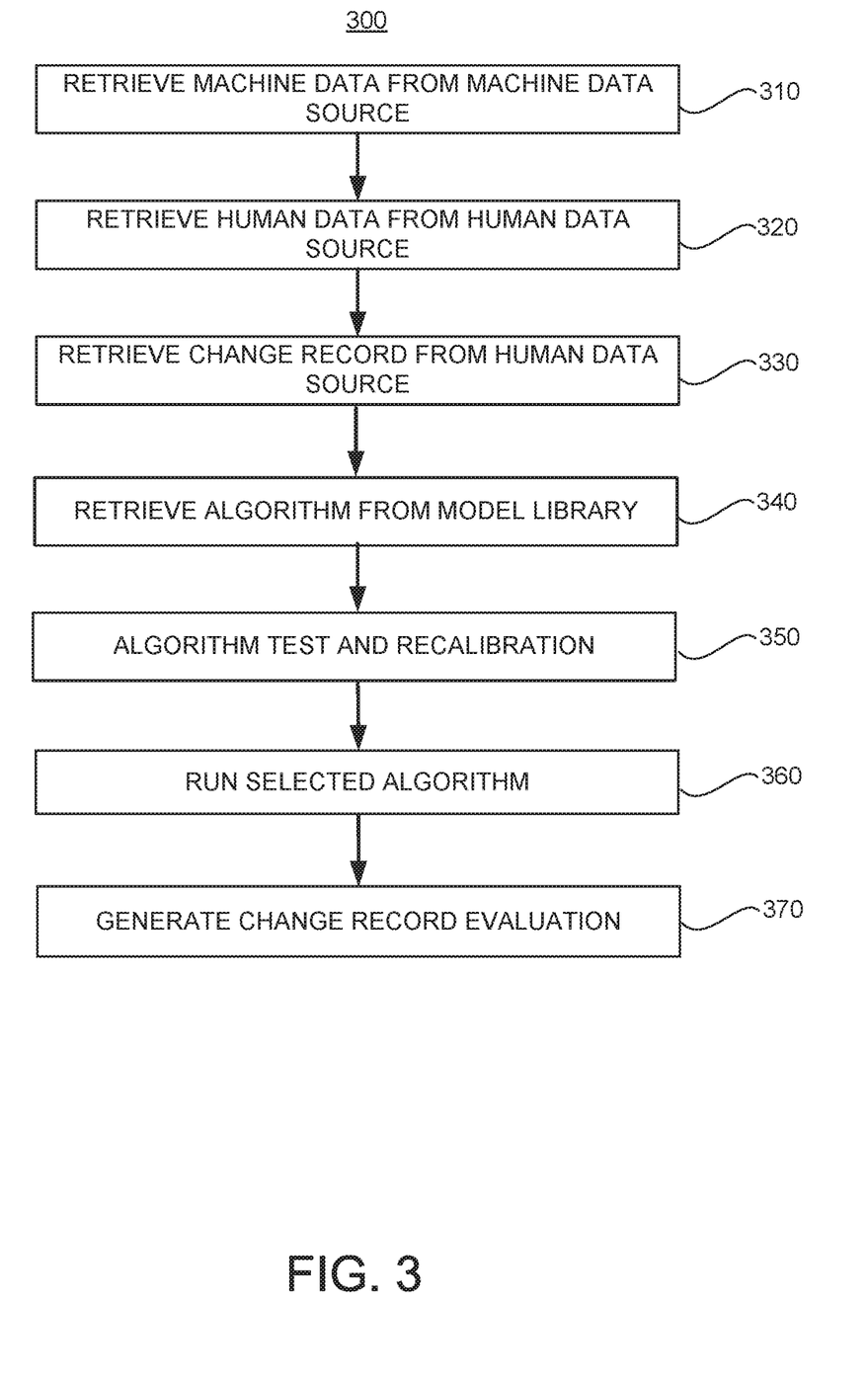
FIG. 3 illustrates a process flow for a method of preventing computer downtime, in accordance with various embodiments.

Referring now to FIG. 3, a flowchart of a method 300 for decreasing computer downtime is illustrated, according to various embodiments. The process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIG. 3, but also to the various system components as described above with reference to FIG. 1.

The master processor may retrieve machine data from a machine data source (step 310). In various embodiments, the machine data may include monitoring data of one or more applications running on an infrastructure layer. The processor may store historical machine data retrieved from the machine data source. The master processor may retrieve human data from a human data source (step 320). The human data may include problem records, incident records, and/or system development life cycle artifacts. The master processor may retrieve a change record from the human data source (step 330). The change record may describe a change that is scheduled to be made to the computer system.

The master processor may retrieve an algorithm from a model library on a machine learning and artificial intelligence model processor (step 340). The model library may contain a plurality of algorithms. In various embodiments, the model processor may evaluate the plurality of algorithms and determine which algorithm has been the most accurate historically. The model processor may select the historically most accurate algorithm.

The algorithm may be tested (step 350). In various embodiments, the testing may an include an initial test, a validation, and a soft launch of the algorithm. A subject matter expert may evaluate the test and provide an analysis and feedback of the test. The master processor or the model processor may interpret the feedback from the subject matter expert and recalibrate the algorithm. This analysis and recalibration may be performed iteratively until the subject matter expert and/or the master processor indicate that the algorithm has met minimum standards for accuracy.

The master processor may run the selected algorithm (step 360). The algorithm may calculate a likelihood that the change described in the change record will cause a computer malfunction. The algorithm may calculate, for example, which server or portion of the computer system is likely to malfunction, how much downtime will be expected, an estimated financial cost of the malfunction, the number of individuals likely to be affected by the malfunction, etc.

The master processor may generate and transmit a change record evaluation to the data handling processor (step 370). The change record evaluation may include the results of the algorithm ran by the master processor, including the likelihood that the change record will cause a computer malfunction. A technician may evaluate the change record evaluation and determine whether any modifications to the computer system or the proposed change are desired or necessary. The technician may input an acceptance or rejection of the change record evaluation to the data handling processor. The acceptance may indicate that the master processer correctly predicted whether the proposed change would cause a computer malfunction. The rejection may indicate that the change record incorrectly predicted whether the proposed change would cause a computer malfunction. The master processor may receive the acceptance or rejection and update the algorithm with the result in order to improve the algorithm for future iterations.

By using a combination of historical machine data with real time machine data, evaluating machine data for multiple applications simultaneously, and combining human data with the machine data, the systems described herein may be able to accurately predict potential computer malfunctions and alert individuals in order to prevent the malfunction from occurring. Thus, the systems and methods described herein may decrease downtime of computer systems and improve their efficiency and functionality.

In various embodiments, the databases described herein may comprise a big data environment and/or a distributed computing cluster. As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A distributed computing cluster may be, for example, a HADOOP® cluster configured to process and store big data sets with some of nodes comprising a distributed storage system and some of nodes comprising a distributed processing system. In that regard, distributed computing cluster may be configured to support a HADOOP® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

The disclosure and claims do not describe only a particular outcome of preventing computer downtime, but the disclosure and claims include specific rules for implementing the outcome of preventing computer downtime and that render information into a specific format that is then used and applied to create the desired results of preventing computer downtime, as set forth in McRO, Inc. v. Bandai Namco Games America Inc. (Fed. Cir. case number 15-1080, Sep. 13, 2016). In other words, the outcome of preventing computer downtime can be performed by many different types of rules and combinations of rules, and this disclosure includes various embodiments with specific rules. While the absence of complete preemption may not guarantee that a claim is eligible, the disclosure does not sufficiently preempt the field of preventing computer downtime at all. The disclosure acts to narrow, confine, and otherwise tie down the disclosure so as not to cover the general abstract idea of just preventing computer downtime. Significantly, other systems and methods exist for preventing computer downtime, so it would be inappropriate to assert that the claimed invention preempts the field or monopolizes the basic tools of preventing computer downtime. In other words, the disclosure will not prevent others from preventing computer downtime, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information (e.g., the result set) and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email, a result set, etc.) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, FACEBOOK® message, TWITTER® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The computer system or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, MOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® ACCESS® or MICROSOFT® SQL Server® by MICROSOFT® Corporation (Redmond, Wash.), MYSQL® by MySQL AB (Uppsala, Sweden), or any other suitable database product. Moreover, the databases may be organized in any suitable manner, for example, as data tables or lookup tables. Each record may be a single file, a series of files, a linked series of data fields. or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, and U.S. application Ser. No. 15/682,180 titled SYSTEMS AND METHODS FOR DATA FILE TRANSFER BALANCING AND CONTROL ON BLOCKCHAIN and filed Aug. 21, 2017, the contents of which are incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as MICROSOFT® ACCESS® or MICROSOFT® SQL Server, ORACLE®, SYBASE®, INFORMIX® MySQL, INTERBASE®, etc., may be used to provide an Active Data Object (ADO) compliant database management system. In one embodiment, the Apache web server is used in conjunction with a Linux operating system, a MYSQL® database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

Those skilled in the art will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, May be Implemented as an Open Source Library to Aid in Organizing the Installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
retrieving, by a processor, machine data from a machine data source;
retrieving, by the processor, incident report data describing one or more computer malfunctions from an incident report data source;
retrieving, by the processor, a change record representing a scheduled change to a configuration of a computer system, the change record specifying when the scheduled change is scheduled to occur, a number of phases in which the scheduled change will be implemented, and one or more environments in which the scheduled change has been tested;
retrieving, by the processor, an algorithm from a model library;
determining, by the processor using the algorithm and based at least in part on the scheduled change described by the change record, the machine data, and the incident report data, a likelihood that the change record will cause a computer malfunction in the computer system;

determining, by the processor using the algorithm and based at least in part on the machine data and the incident report data, an estimated cost associated with the computer malfunction; and generating, by the processor, a change record evaluation, the change record evaluation comprising the likelihood that the change record will cause the computer malfunction and the estimated cost associated with the computer malfunction.

2. The method of claim 1, wherein the machine data comprises historical data and real time data.

3. The method of claim 1, further comprising correlating, by the processor and using the machine data, a first spike in computing resource consumption by a first application with a second spike in computing resource consumption by a second application, the first spike corresponding to a first increase of at least three standard deviations over average variability for the computing resource consumption by the first application, and the second spike corresponding to a second increase of at least three standard deviations over average variability for the computing resource consumption by the second application.

4. The method of claim 1, wherein the change record comprises a software upgrade and a time of upgrade.

5. The method of claim 1, further comprising recalibrating, by the processor, the algorithm based at least in part on feedback from a subject matter expert.

6. The method of claim 5, wherein the problem record identifies a previous problem, and wherein the incident record identifies a current problem.

7. The method of claim 1, further comprising selecting the algorithm from a plurality of algorithms stored in the model library based at least in part on an accuracy of the algorithm.

8. A system comprising:
a processor; and
a tangible, non-transitory memory configured to communicate with the processor, the tangible, non-transitory memory having instructions stored thereon that, in response to execution by the processor, cause the processor to perform operations comprising:
retrieving, by the processor, machine data from a machine data source;
retrieving, by the processor, incident report data describing one or more computer malfunctions from an incident report data source;
retrieving, by the processor, a change record representing a scheduled change to a configuration of a computer system, the change record specifying when the scheduled change is scheduled to occur, a number of phases in which the scheduled change will be implemented, and one or more environments in which the scheduled change has been tested;
retrieving, by the processor, an algorithm from a model library;
determining, by the processor using the algorithm and based at least in part on the scheduled change described by the change record, the machine data, and the incident report data, a likelihood that the change record will cause a computer malfunction in the computer system;
determining, by the processor using the algorithm and based at least in part on the machine data and the incident report data, an estimated cost associated with the computer malfunction; and
generating, by the processor, a change record evaluation, the change record evaluation comprising the likelihood that the change record will cause the computer malfunction and the estimated cost associated with the computer malfunction.

9. The system of claim 8, wherein the machine data comprises historical data and real time data.

10. The system of claim 8, the operations further comprising correlating, by the processor and using the machine data, a first spike in computing resource consumption by a first application with a second spike in computing resource consumption by a second application, the first spike corresponding to a first increase of at least three standard deviations over average variability for the computing resource consumption by the first application, and the second spike corresponding to a second increase of at least three standard deviations over average variability for the computing resource consumption by the second application.

11. The system of claim 8, wherein the change record comprises a software upgrade and a time of upgrade.

12. The system of claim 8, the operations further comprising recalibrating, by the processor, the algorithm based at least in part on feedback from a subject matter expert.

13. The system of claim 12, wherein the problem record identifies a previous problem, and wherein the incident record identifies a current problem.

14. The system of claim 8, the operations further comprising selecting the algorithm from a plurality of algorithms stored in the model library based at least in part on an accuracy of the algorithm.

15. An article of manufacture including a non-transitory, tangible computer readable storage medium having instructions stored thereon that, in response to execution by a computer based system, cause the computer based system to perform operations comprising:
retrieving, by a processor, machine data from a machine data source;
retrieving, by the processor, incident report data describing one or more computer malfunctions from an incident report data source;
retrieving, by the processor, a change record representing a scheduled change to a configuration of a computer system, the change record specifying when the scheduled change is scheduled to occur, a number of phases in which the scheduled change will be implemented, and one or more environments in which the scheduled change has been tested;
retrieving, by the processor, an algorithm from a model library;
determining, by the processor using the algorithm and based at least in part on the scheduled change described by the change record, the machine data, and the incident report data, a likelihood that the change record will cause a computer malfunction in the computer system;
determining, by the processor using the algorithm and based at least in part on the machine data and the incident report data, an estimated cost associated with the computer malfunction; and
generating, by the processor, a change record evaluation, the change record evaluation comprising the likelihood that the change record will cause the computer malfunction and the estimated cost associated with the computer malfunction.

16. The article of manufacture of claim 15, wherein the machine data comprises historical data and real time data.

17. The article of manufacture of claim 15, the operations further comprising correlating, by the processor and using the machine data, a first spike in computing resource consumption by a first application with a second spike in computing resource consumption by a second application, the first spike corresponding to a first increase of at least three standard deviations over average variability for the computing resource consumption by the first application, and the second spike corresponding to a second increase of at least three standard deviations over average variability for the computing resource consumption by the second application.

18. The article of manufacture of claim 15, wherein the change record comprises a software upgrade and a time of upgrade.

19. The article of manufacture of claim 15, the operations further comprising recalibrating, by the processor, the algorithm based at least in part on feedback from a subject matter expert.

20. The article of manufacture of claim 19, wherein the problem record identifies a previous problem, and wherein the incident record identifies a current problem.

* * * * *